United States Patent
Su et al.

(10) Patent No.: US 10,412,591 B2
(45) Date of Patent: Sep. 10, 2019

(54) SIMULTANEOUS VOLTE AND 2G/3G/LTE DATA IN DUAL SIM CONFIGURATION

(71) Applicant: Apple Inc., Cupertino, CA (US)

(72) Inventors: Li Su, San Jose, CA (US); Jianxiong Shi, Dublin, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 14/795,104

(22) Filed: Jul. 9, 2015

(65) Prior Publication Data

US 2016/0029222 A1    Jan. 28, 2016

Related U.S. Application Data

(60) Provisional application No. 62/029,389, filed on Jul. 25, 2014.

(51) Int. Cl.
*H04W 4/16* (2009.01)
*H04L 29/06* (2006.01)
(Continued)

(52) U.S. Cl.
CPC .......... *H04W 16/14* (2013.01); *H04B 1/3816* (2013.01); *H04L 65/1069* (2013.01);
(Continued)

(58) Field of Classification Search
CPC ..... H04W 16/14; H04W 76/026; H04W 4/16; H04W 72/10; H04W 88/061; H04B 1/3816; H04L 65/1069
See application file for complete search history.

(56) References Cited

U.S. PATENT DOCUMENTS 6,438,376 B1 * 8/2002 Elliott .................. H04W 36/32
   455/437
8,170,616 B2    5/2012 Lee
(Continued)

OTHER PUBLICATIONS

Written Opinion for International Application No. PCT/US2015/040579, dated Jun. 15, 2016, pp. 1-9.
(Continued)

*Primary Examiner* — Alex Skripnikov
*Assistant Examiner* — Richard Schnell
(74) *Attorney, Agent, or Firm* — Meyertons Hood Kivlin Kowert and Goetzel PC; Jeffrey C. Hood; Brian E. Moore

(57) ABSTRACT

A user equipment (UE) device may perform uplink (UL) data communication using a first radio access technology (RAT) while performing an UL voice call communication using a second RAT. The UL data communication may be supported by a first subscriber identity module (SIM) and the UL packet switched voice call communication may be supported by a second SIM. The UL voice call communication may be a packet switched communication. The communications may be performed by a radio(s) of the UE. The radio(s) may include shared physical layer resources that are shared between the UL data and UL voice communications. The UE may also include a single transmitter that may be shared between the UL data and UL packet voice communications and the UL data communication may use a first portion of the single transmitter's TTI and the UL voice communication may use a second portion of the single transmitter's TTI.

20 Claims, 7 Drawing Sheets

(51) Int. Cl.
*H04W 16/14* (2009.01)
*H04W 72/10* (2009.01)
*H04W 76/16* (2018.01)
*H04W 88/06* (2009.01)
*H04B 1/3816* (2015.01)

(52) U.S. Cl.
CPC .............. *H04W 4/16* (2013.01); *H04W 72/10* (2013.01); *H04W 76/16* (2018.02); *H04W 88/06* (2013.01)

(56) References Cited

U.S. PATENT DOCUMENTS

| | | | |
|---|---|---|---|
| 8,805,375 | B2 | 8/2014 | Periyalwar et al. |
| 8,934,460 | B1 | 1/2015 | Hu et al. |
| 2005/0281277 | A1* | 12/2005 | Killian .................... H04L 45/22 370/412 |
| 2010/0202331 | A1* | 8/2010 | Zhang ................. H04W 52/286 370/310 |
| 2011/0217969 | A1 | 9/2011 | Spartz et al. |
| 2012/0182938 | A1 | 7/2012 | Mujtaba et al. |
| 2012/0184265 | A1 | 7/2012 | Love et al. |
| 2012/0190362 | A1 | 7/2012 | Subbarayudu et al. |
| 2013/0272260 | A1 | 10/2013 | Bitran et al. |
| 2014/0119345 | A1* | 5/2014 | Sikri ................... H04W 76/048 370/336 |
| 2014/0194157 | A1 | 7/2014 | Ezekiel et al. |
| 2014/0287789 | A1* | 9/2014 | Matsuoka ............. H04W 24/08 455/509 |
| 2015/0009874 | A1* | 1/2015 | Edara ................ H04W 52/0225 370/311 |
| 2015/0280880 | A1* | 10/2015 | Yang ..................... H04L 5/0053 370/329 |
| 2015/0334553 | A1* | 11/2015 | Yang ..................... H04L 1/1854 455/552.1 |
| 2015/0350982 | A1* | 12/2015 | Batchu ................. H04W 36/14 455/424 |
| 2015/0373671 | A1* | 12/2015 | Yang ..................... H04W 72/02 455/450 |
| 2016/0014579 | A1* | 1/2016 | Kasilya Sudarsan ... H04W 4/16 455/417 |
| 2017/0127436 | A1* | 5/2017 | Li ............................. H04L 5/00 |

OTHER PUBLICATIONS

Universal Mobile Telecommunications System (UMTS); LTE; 3GPP system to Wireless Local Area Network (WLAN) Interworking; WLAN User Equipment (WLAN UE) to network protocols; Stage 3; 3GPP TS 24.234 version 10.5.0 Release 10; Jun. 26, 2014, pp. 1-42.

International Search Report & Written Opinion, Application No. PCT/US2015/040579, dated Oct. 21, 2015, 16 pages.

\* cited by examiner

SIMULTANEOUS VOLTE AND 2G/3G/LTE
DATA IN DUAL SIM CONFIGURATION

PRIORITY DATA

This application claims benefit of priority to U.S. Provisional Application Ser. No. 62/029,389, titled "Simultaneous VoLTE and 2G/3G/LTE Data in Dual SIM Configuration", filed Jul. 25, 2014, by Li Su, Jianxiong Shi, and Johnson O Sebeni, which is hereby incorporated by reference in its entirety as though fully and completely set forth herein.

FIELD OF THE INVENTION

The present application relates to wireless devices, and more particularly to a system and method for providing improved performance and/or reduced power consumption in wireless devices that support multiple radio access technologies (RATs).

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, the large amount of functionality present in a user equipment (UE), e.g., a wireless device such as a cellular phone, can place a significant strain on the battery life of the UE. Further, where a UE is configured to support multiple radio access technologies (RATs), certain performance degradations can occur on one or more of the RATs, such as due to tune-away operations of the other RAT. As a result, techniques are desired which provide power savings and/or improved performance in such wireless UE devices.

New and improved cellular radio access technologies (RATs) are sometimes deployed in addition to existing RATs. For example, networks implementing Long Term Evolution (LTE) technology, developed and standardized by the Third Generation Partnership Project (3GPP), are currently being deployed. LTE and other newer RATs often support faster data rates than networks utilizing legacy RATs, such as various second generation (2G) and third generation (3G) RATs.

However, in some deployments, LTE and other new RATs may not fully support some services that can be handled by legacy networks. Accordingly, LTE networks are often co-deployed in overlapping regions with legacy networks and UE devices may transition between RATs as services or coverage may require. For example, in some deployments, LTE networks are not capable of supporting voice calls. Thus, for example when a UE device receives or initiates a circuit switched voice call while connected to an LTE network that does not support voice calls, the UE device can transition to a legacy network, such as one which uses a GSM (Global System for Mobile Communications) RAT or a "1×" (Code Division Multiple Access 2000 (CDMA2000) 1×) RAT that supports voice calls, among other possibilities.

Some UE devices use a single radio to support operation on multiple cellular RATs. For example, some UE devices use a single radio to support operation on both LTE and GSM networks. The use of a single radio for multiple RATs makes transitioning between networks, such as in response to a page message for an incoming voice call or circuit switched service, more complex. In addition, the use of a single radio for multiple RATs presents certain power usage and performance issues.

For these reasons, existing UE devices that use at least one radio to support concurrent operation on multiple RATs are limited to using a first RAT (e.g. LTE, 1×) for data, and only GSM for voice. However, a shrinking GSM footprint due to GSM frequency reclassification for 3G and LTE combined with fast expansion of LTE coverage, and more particularly, voice over LTE (VoLTE) has made it desirable to provide additional options for maintaining multiple concurrent cellular communication connections on a single radio.

SUMMARY OF THE INVENTION

Embodiments described herein relate to a User Equipment (UE) device and associated methods for performing uplink (UL) data communication and UL packet switched voice communication. A UE device may include two or more subscriber identity modules (SIMs). A radio(s) may be coupled to the SIMs and may be configured to perform uplink (UL) data communication using a first radio access technology (RAT). The UL data communication may be supported by the first smart card. In some embodiments, the UL data communication may be according to a packet switched communication protocol such as UMTS or Evolution Data Optimized (EVDO), among other packet switched protocols. Note that UMTS generally refers to UMTS-FDD over, for example, a wideband CDMA (WCDMA) air interface and/or UMTS-TDD over, for example, a time division synchronous code division multiplex access (TD-SCDMA) air interface.

Additionally, the radio(s) may be configured to perform an UL voice call communication using a second RAT and supported by the second smart card. The UL voice call communication may be a packet switched communication and may be given a higher priority than the UL data communication. In some embodiments, the UL voice call communication may be according to voice over LTE (VoLTE). Thus, the UE may concurrently maintain two different communication connections, each supported by a separate SIM.

Further, the radio(s) may include shared physical layer resources that are shared between the UL data and UL voice communications. Thus, the UL data communication may use a first portion of a transmit time interval (TTI) and the UL voice call communication may use a second portion of the TTI.

Furthermore, the UE may include a single transmitter that may be shared between the UL data and UL voice communications and the UL data communication may use a first portion of the single transmitter's TTI and the UL voice communication may use a second portion of the single transmitter's TTI. Additionally, the UL data communication may include a first portion of transmitted bits and a second portion of lost bits. The lost bits may be bits that were not transmitted during the UL voice call communication. Accordingly, the transmit power that is not used for the lost bits may be applied during transmission of the first portion of the transmitted bits of the UL data communication. In addition, in some embodiments, the transmit power that is not used for the lost bits may applied to UL control channels.

In some embodiments, the single transmitter may be configured to transmit the uplink data communication with a reduced transport block size and the reduced transport block size may result in gaps between transmissions of the UL data communication. Thus, the single transmitter may be configured to transmit the UL voice call communication in the gaps between transmissions of the UL data communication. In some embodiments, the UL voice call communication may be transmitted in the gaps between transmissions of the UL data communication for UL data channels.

In other embodiments, the UE may be configured to monitor a data communication UL channel tune-away gap percentage for the single transmitter. Accordingly, if the data communication UL channel tune-away gap percentage is higher than a threshold, then the UE may be configured to drop one or more UL voice call communication subframes in favor of UL data communication transmissions.

Additionally, in some embodiments, the UE may be configured to monitor an uplink closed loop power control indication from the first RAT. Accordingly, if the uplink closed loop power control indication is higher than a threshold, then the UE may be configured to drop one or more uplink voice call communication subframes in favor of uplink data communication transmissions.

In some embodiments, the radio may include multiple transmitters. Thus, the UE may be configured to perform the UL voice call communication using the second RAT and the UL data communication using the first RAT at least partially concurrently.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
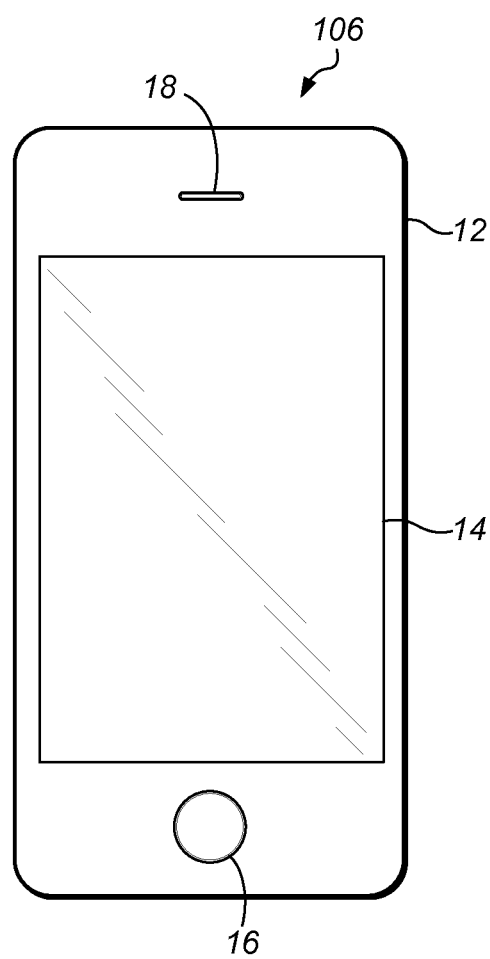
FIG. 1 illustrates an example user equipment (UE) according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
RAT: Radio Access Technology
TX: Transmit
RX: Receive
DSDA: Dual SIM/Dual Active
DSDS: Dual SIM/Dual Standby Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates an example user equipment (UE) 106 according to some embodiments. The term UE 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may support multiple radio access technologies (RATs). For example, UE 106 may be configured to communicate using any of various RATs such as two or more of Global System for Mobile Communications (GSM), Universal Mobile Telecommunications System (UMTS), Code Division Multiple Access (CDMA) (e.g., CDMA2000 1×RTT or other CDMA radio access technologies), Long Term Evolution (LTE), Advanced LTE, and/or other RATs. For example, the UE 106 may support at least two radio access technologies such as LTE and GSM. Various different or other RATs may be supported as desired.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains that operate on the same frequency. In another embodiment, the UE 106 comprises two or more radios, i.e., two or more TX/RX chains (two or more TX chains and two or more RX chains).

In the embodiment described herein, the UE 106 comprises two antennas which communicate using two or more RATs. For example, the UE 106 may have a pair of cellular telephone antennas coupled to a single radio or shared radio. The antennas may be coupled to the shared radio (shared wireless communication circuitry) using switching circuits and other radio-frequency front-end circuitry. For example, the UE 106 may have a first antenna that is coupled to a transceiver or radio, i.e., a first antenna that is coupled to a transmitter chain (TX chain) for transmission and which is coupled to a first receiver chain (RX chain) for receiving. The UE 106 may also comprise a second antenna that is coupled to a second RX chain.

In some embodiments, the two receiver chains operate as a pair and time multiplex among two or more RATs, such as LTE and one or more other RATs such as GSM or CDMA1×. In the primary embodiment described herein the UE 106 comprises one transmitter chain and two receiver chains, wherein the transmitter chain and the two receiver chains (acting as a pair) time multiplex between two (or more) RATs, such as LTE and UMTS.

Each antenna may receive a wide range of frequencies such as from 600 MHz up to 3 GHz. Thus, for example, the local oscillator of the two receiver chains may tune to a specific frequency such as an LTE frequency band, where the first receiver chain receives samples from antenna 1 and the second receiver chain receives samples from antenna 2, both on the same frequency (e.g., if they use the same local oscillator). The wireless circuitry in the UE 106 can be configured in real time depending on the desired mode of operation for the UE 106.

Figure 2:
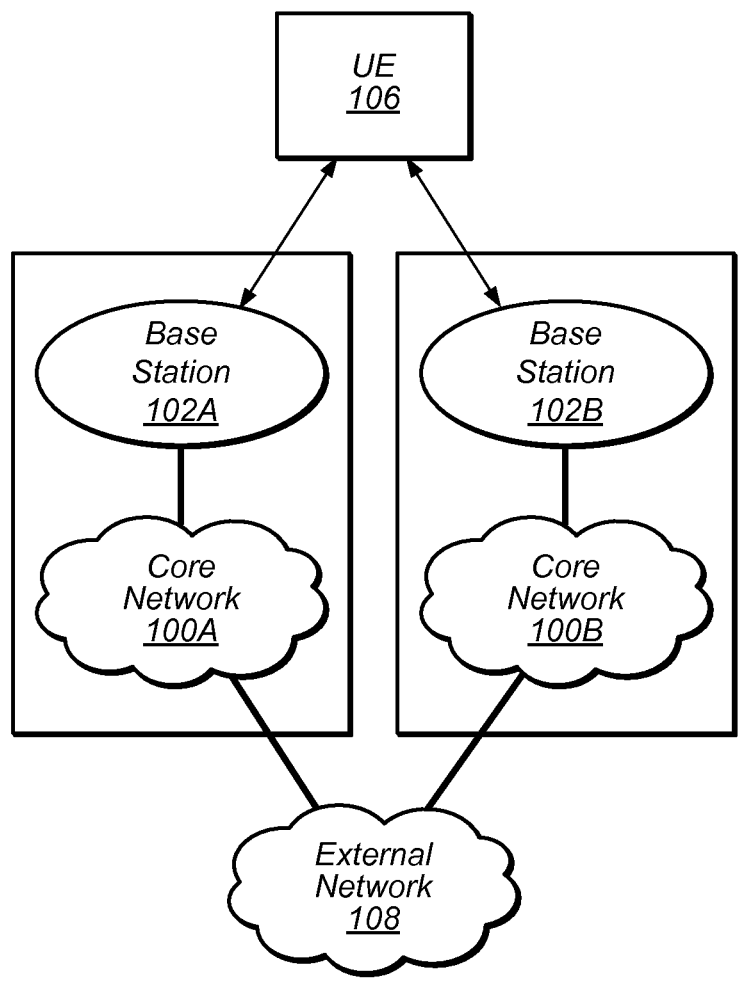
FIG. 2 illustrates an example wireless communication system where a UE communicates with two base stations using two different RATs, according to some embodiments.

FIG. 2—Communication System

FIG. 2 illustrates an exemplary (and simplified) wireless communication system, according to some embodiments. It is noted that the system of FIG. 2 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS ((including UMTS frequency division duplex (UMTS-FDD) and UMTS time division duplex (UMTS-TDD)), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 2, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In some embodiments, the UE 106 may be configured to use a first RAT that is a packet-switched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 3:
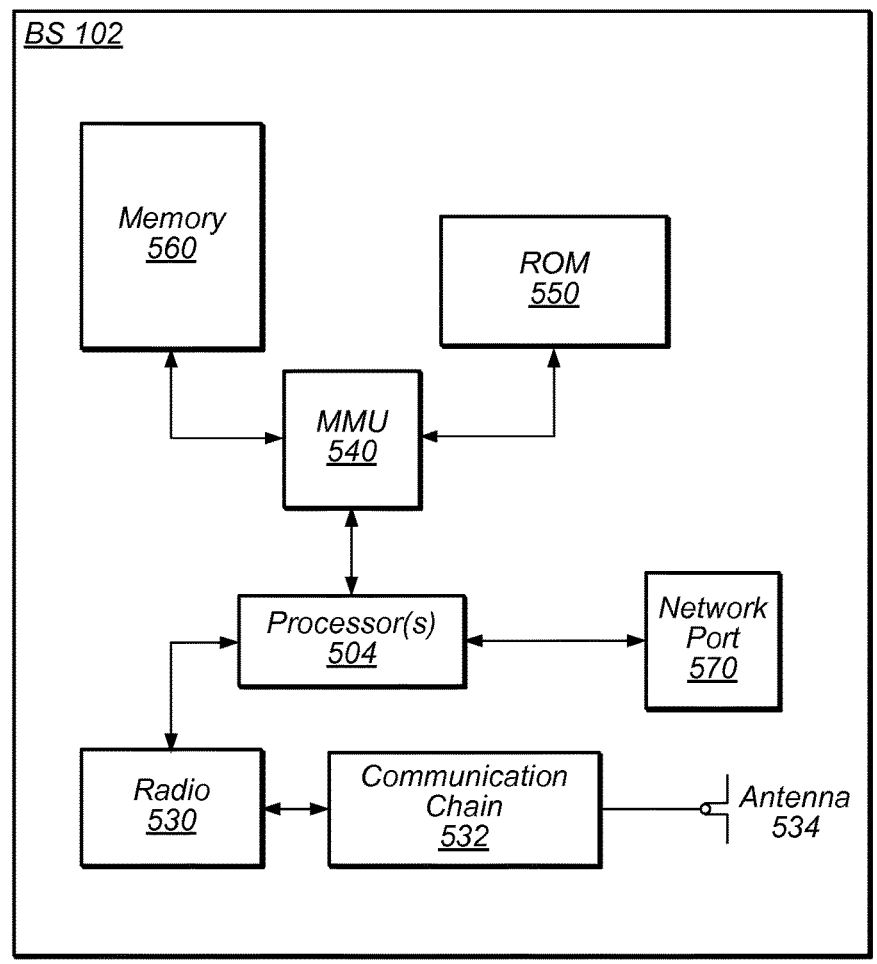
FIG. 3 is an example block diagram of a base station, according to some embodiments.

FIG. 3—Base Station

FIG. 3 illustrates an exemplary block diagram of a base station 102, according to some embodiments. It is noted that the base station of FIG. 3 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 4:
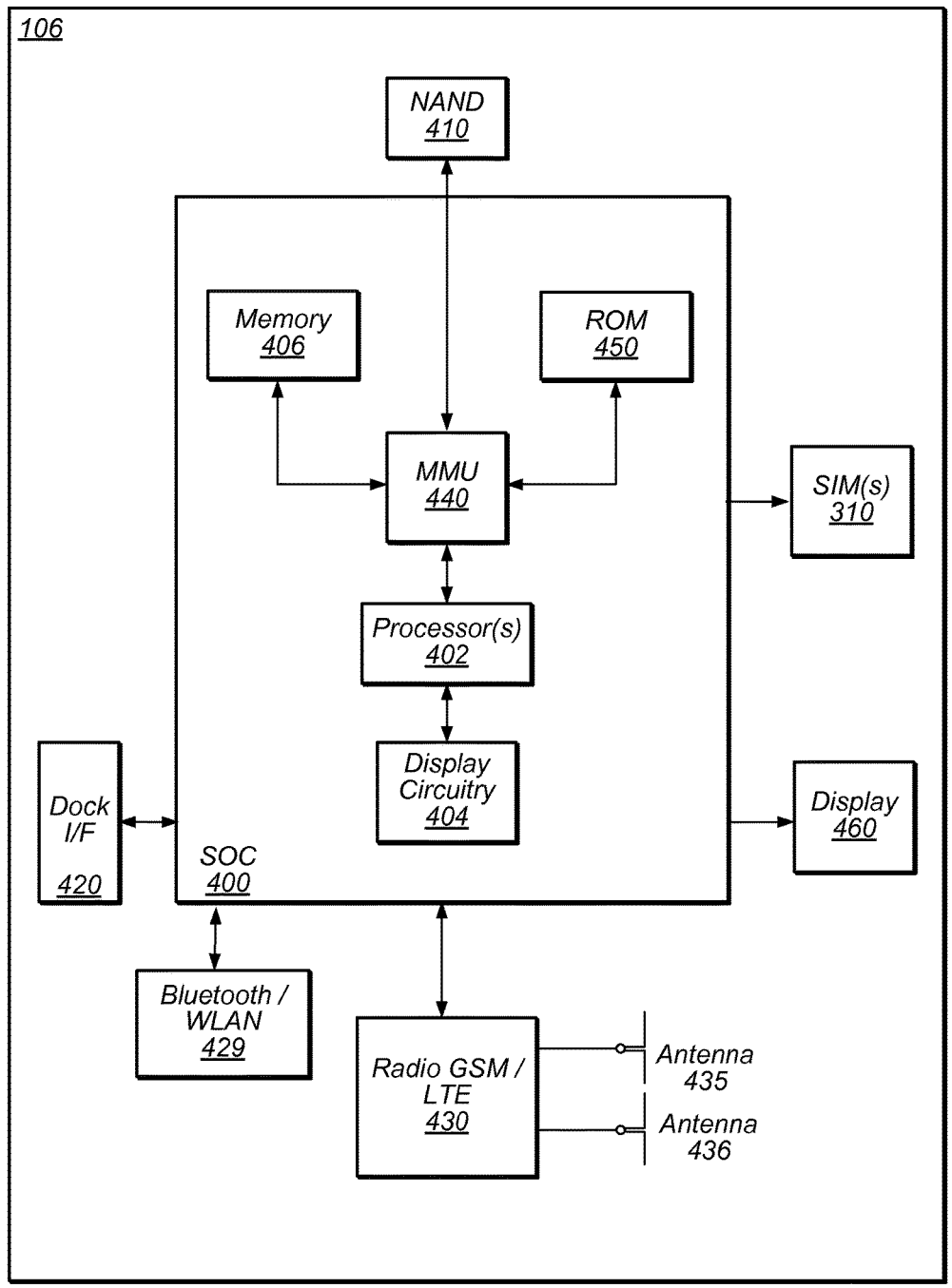
FIG. 4 is an example block diagram of a UE, according to some embodiments.

FIG. 4—User Equipment (UE)

FIG. 4 illustrates an example simplified block diagram of a UE 106, according to some embodiments. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Bluetooth and WLAN circuitry). The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402.

The UE 106 may further comprise one or more SIMs (Subscriber Identity Modules) 310 that comprise SIM (Subscriber Identity Module) functionality. The term "SIM" or "SIM entity" is intended to include any of various types of SIM implementations or SIM functionality, such as one or more UICC(s) (Universal Integrated Circuit Card(s)) cards, one or more eUICCs, one or more eSIMs, either removable or embedded, etc. In some embodiments, the UE 106 comprises at least two SIMs 310. Each SIM may execute one or more Subscriber Identity Module (SIM) applications and/or otherwise implement SIM functionality. Thus, each SIM 310 may be a single smart card that may be embedded, e.g., may be soldered onto a circuit board in the UE 106, or each SIM 310 may be implemented as a removable smart card. Thus the SIM(s) 310 may be one or more removable smart cards (such as UICC cards, which are sometimes referred to as "SIM cards"), and/or the SIMs 310 may be one or more embedded cards (such as embedded UICCs (eUICCs), which are sometimes referred to as "eSIMs" or "eSIM cards"). In some embodiments (such as when the SIM(s) 310 include an eUICC), one or more of the SIM(s) 310 may implement embedded SIM (eSIM) functionality; in such an embodiment, a single one of the SIM(s) 310 may execute multiple SIM applications. Each of the SIMs 310 may include components such as a processor and/or a memory; instructions for performing SIM/eSIM functionality may be stored in the memory and executed by the processor. In some embodiments, the UE 106 may comprise a combination of removable smart cards and fixed/non-removable smart cards (such as one or more eUICC cards that implement eSIM functionality), as desired. For example, the UE 106 may comprise two embedded SIMs 310, two removable SIMs 310, or a combination of one embedded SIMs 310 and one removable SIMs 310. Various other SIM configurations are also contemplated.

As noted above, in some embodiments, the UE 106 comprises two or more SIMs, The inclusion of two or more SIMs 310 in the UE 106 may allow the UE 106 to support two different telephone numbers and may allow the UE 106 to communicate on corresponding two or more respective networks. For example, a first SIM 310 may support a first RAT such as LTE, and a second SIM 310 support a second RAT such as UMTS. Other implementations and RATs are of course possible. Where the UE 106 comprises two SIMs 310, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology. In another embodiment, the UE 106 supports Dual SIM Dual Standby (DSDS) functionality. The DSDS functionality may allow either of the two SIMs 310 in the UE 106 to be on standby waiting for a voice call and/or data connection. In DSDS, when a call/data is established on one SIM 310, the other SIM 310 is no longer active. In some embodiments, DSDx functionality (either DSDA or DSDS functionality) may be implemented with a single SIM (e.g., a eUICC) that executes multiple SIM applications for different carriers and/or RATs.

As noted above, the UE 106 may be configured to communicate wirelessly using multiple radio access technologies (RATs). As further noted above, in such instances, the cellular communication circuitry (radio(s)) 430 may include radio components which are shared between multiple RATS and/or radio components which are configured exclusively for use according to a single RAT. Where the UE 106 comprises at least two antennas, the antennas 435 and 436 may be configurable for implementing MIMO (multiple input multiple output) communication.

As described herein, the UE 106 may include hardware and software components for implementing features for communicating using two or more RATs, such as those described herein. The processor 402 and/or the radio 430 of the UE device 106 may be configured to implement part or all of the features described herein, e.g., by executing program instructions stored on a memory medium (e.g., a non-transitory computer-readable memory medium). Alternatively (or in addition), one or more of the processor 402 and the radio 430 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5A:
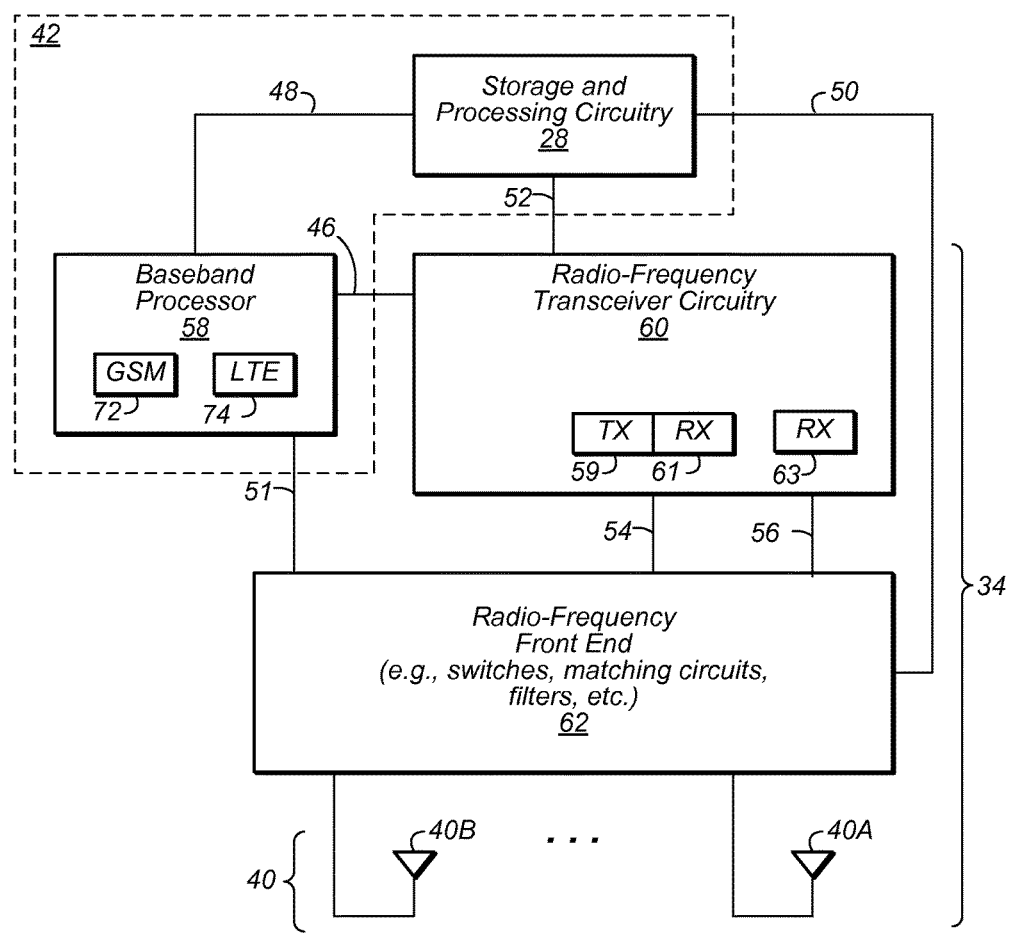
FIGS. 5A and 5B are example block diagrams of wireless communication circuitry in the UE, according to some embodiments.
Figure 5B:
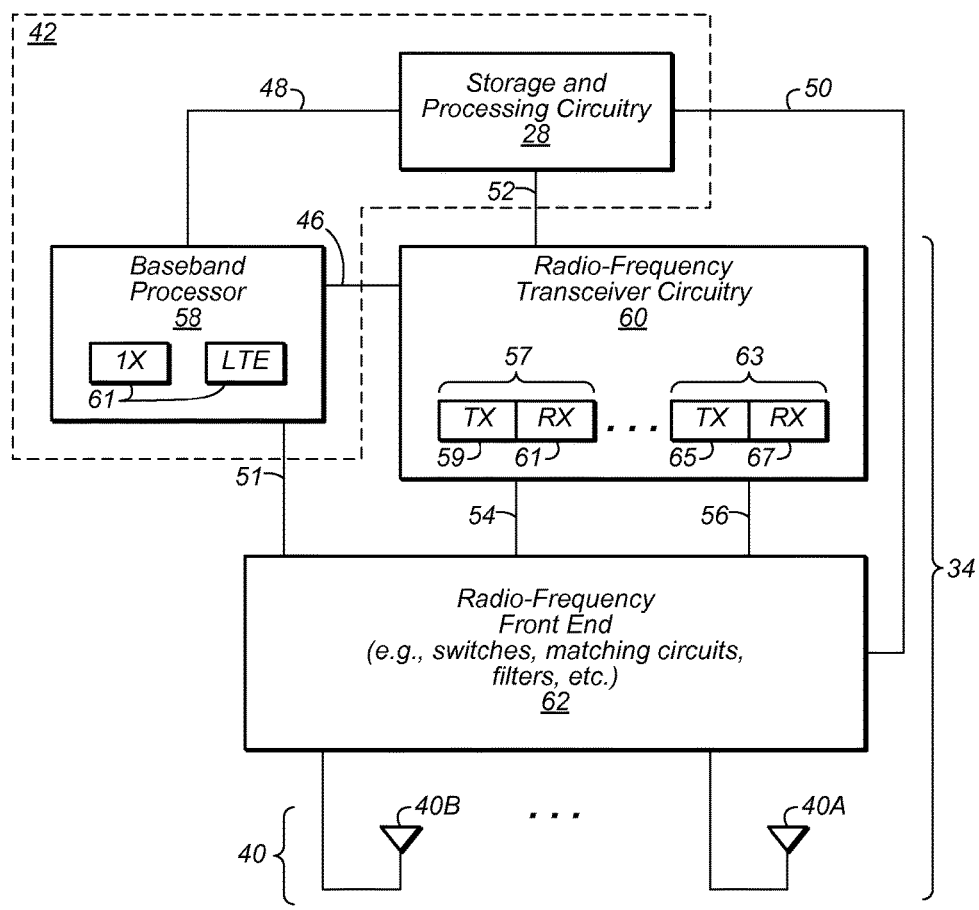

FIGS. 5A and 5B—UE Transmit/Receive Logic

FIG. 5A illustrates a portion of UE 106 according to some embodiments. As shown, UE 106 may comprise control circuitry 42 that is configured to store and execute control code for implementing control algorithms in the UE 106. Control circuitry 42 may include storage and processing circuitry 28 (e.g., a microprocessor, memory circuits, etc.) and may include baseband processor integrated circuit 58. Baseband processor 58 may form part of wireless circuitry 34 and may include memory and processing circuits (i.e., baseband processor 58 may be considered to form part of the storage and processing circuitry of UE 106). Baseband processor 58 may comprise software and/or logic for handling various different RATs, such as GSM logic 72 and LTE logic 74, among others.

Baseband processor 58 may provide data to storage and processing circuitry 28 (e.g., a microprocessor, nonvolatile memory, volatile memory, other control circuits, etc.) via path 48. The data on path 48 may include raw and processed data associated with UE cellular communications and operations, such as cellular communication data, wireless (antenna) performance metrics for received signals, information related to tune-away operations, information related to paging operations, etc. This information may be analyzed by storage and processing circuitry 28 and/or processor 58 and, in response, storage and processing circuitry 28 (or, if desired, baseband processor 58) may issue control commands for controlling wireless circuitry 34. For example, storage and processing circuitry 28 may issue control commands on path 52 and path 50 and/or baseband processor 58 may issue commands on path 46 and path 51.

Wireless circuitry 34 may include radio-frequency transceiver circuitry such as radio-frequency transceiver circuitry 60 and radio-frequency front-end circuitry 62. Radio-frequency transceiver circuitry 60 may include one or more radio-frequency transceivers. In the embodiment shown radio-frequency transceiver circuitry 60 comprises transceiver (TX) chain 59, receiver (RX) chain 61 and RX chain 63. As noted above, the two RX chains 61 and 63 may be a primary RX chain 61 and a diversity RX chain 63. The two RX chains 61 and 63 may be connected to the same local oscillator (LO) and thus may operate together at the same frequency for MIMO operations. Thus the TX chain 59 and the two RX chains 61 and 63 may be considered, along with other necessary circuitry, as a single radio. Other embodiments are of course contemplated. For example, the radio-frequency transceiver circuitry 60 may comprise only a single TX chain and only a single RX chain, also a single radio embodiment. Thus the term "radio" may be defined to have the broadest scope of its ordinary and accepted meaning, and comprises the circuitry normally found in a radio, including, but not limited to, either a single TX chain and a single RX chain or a single TX chain and two (or more) RX chains, e.g., connected to the same LO. The term radio may encompass the transmit and receive chains discussed above and may also include digital signal processing coupled to the radio frequency circuitry (e.g., the transmit and receive chains) associated with performing wireless communication. As one example, the transmit chain may include such components as amplifier, mixer, filter, and digital analog converter. Similarly, the receive chain(s) may include, e.g., such components as amplifier, mixer, filter, and analog to digital converter. As mentioned above, multiple receive chains may share a LO, although in other embodiments, they may comprise their own LO. Wireless communication circuitry may encompass a larger set of components, e.g., including one or more radios of the UE (transmit/receive chains and/or digital signal processing), baseband processors, etc. The term "cellular wireless communication circuitry" includes various circuitry for performing cellular communication, e.g., as opposed to other protocols that are not cellular in nature, such as Bluetooth. Certain embodiments of the invention described herein may operate to improve performance when a single radio (i.e., a radio with a single TX chain and single RX chain; or a radio with a single TX chain and two RX chains, where the two RX chains are connected to the same LO) supports multiple RATs.

As shown in FIG. 5B, the radio-frequency transceiver circuitry 60 may also comprise two or more TX chains and two or more RX chains, according to some embodiments. For example, FIG. 5B shows an embodiment with a first radio 57 comprising TX chain 59 and RX chain 61 and a second radio 63 comprising a first TX chain 65 and a second TX chain 67. Embodiments are also contemplated where additional TX/RX receive chains may be included in the embodiment of FIG. 5A, i.e., in addition to the one TX chain 59 and two RX chains 61 and 63 shown. In these embodiments that have multiple TX and RX chains, when only one radio is currently active, e.g., the second radio is turned off to save power, certain embodiments of the invention described herein may operate to improve performance of the single active radio when it supports multiple RATs.

Baseband processor 58 may receive digital data that is to be transmitted from storage and processing circuitry 28 and may use path 46 and radio-frequency transceiver circuitry 60 to transmit corresponding radio-frequency signals. Radio-frequency front end 62 may be coupled between radio-frequency transceiver 60 and antennas 40 and may be used to convey the radio-frequency signals that are produced by radio-frequency transceiver circuitry 60 to antennas 40. Radio-frequency front end 62 may include radio-frequency switches, impedance matching circuits, filters, and other circuitry for forming an interface between antennas 40 and radio-frequency transceiver 60.

Incoming radio-frequency signals that are received by antennas 40 may be provided to baseband processor 58 via radio-frequency front end 62, paths such as paths 54 and 56, receiver circuitry in radio-frequency transceiver 60, and paths such as path 46. Path 54 may, for example, be used in handling signals associated with transceiver 57, whereas path 56 may be used in handling signals associated with transceiver 63. Baseband processor 58 may convert received signals into digital data that is provided to storage and processing circuitry 28. Baseband processor 58 may also extract information from received signals that is indicative of signal quality for the channel to which the transceiver is currently tuned. For example, baseband processor 58 and/or other circuitry in control circuitry 42 may analyze received signals to produce various measurements, such as bit error rate measurements, measurements on the amount of power associated with incoming wireless signals, strength indicator (RSSI) information, received signal code power (RSCP) information, reference symbol received power (RSRP) information, signal-to-interference ratio (SINR) information, signal-to-noise ratio (SNR) information, channel quality measurements based on signal quality data such as Ec/Io or Ec/No data, etc.

Radio-frequency front end 62 may include switching circuitry. The switching circuitry may be configured by control signals received from control circuitry 42 (e.g., control signals from storage and processing circuitry 28 via path 50 and/or control signals from baseband processor 58 via path 51). The switching circuitry may include a switch (switch circuit) that is used to connect TX and RX chain(s) to antennas 40A and 40B. Radio-frequency transceiver circuitry 60 may be configured by control signals received from storage and processing circuitry over path 52 and/or control signals received from baseband processor 58 over path 46.

The number of antennas that are used may depend on the operating mode for UE 106. For example, as shown in FIG. 5A, in normal LTE operations, antennas 40A and 40B may be used with respective receivers 61 and 63 to implement a receive diversity scheme, such as for MIMO operations. With this type of arrangement, two LTE data streams may be simultaneously received and processed using baseband processor 58. When it is desired to monitor a UMTS paging channel for incoming UMTS pages, one or both of the antennas may be temporarily used in receiving UMTS paging channel signals.

Control circuitry 42 may be used to execute software for handling more than one radio access technology. For example, baseband processor 58 may include memory and control circuitry for implementing multiple protocol stacks such as a UMTS protocol stack 72 and an LTE protocol stack 74. Thus, protocol stack 72 may be associated with a first radio access technology such as UMTS (as an example), and protocol stack 74 may be associated with a second radio access technology such as LTE (as an example). During operation, UE 106 may use UMTS protocol stack 72 to handle UMTS functions and may use LTE protocol stack 74 to handle LTE functions. Additional protocol stacks, additional transceivers, additional antennas 40, and other additional hardware and/or software may be used in UE 106 if desired. The arrangement of FIGS. 5A and 5B is merely illustrative. In some embodiments, one or both of the protocol stacks may be configured to implement the methods described in the flowcharts below.

In some embodiments of FIG. 5A (or 5B), the cost and complexity of UE 106 may be minimized by implementing the wireless circuitry of FIG. 5A (or 5B) using an arrangement in which baseband processor 58 and radio-transceiver circuitry 60 are used to support both LTE and UMTS traffic.

Performing Concurrent Packet Switched Voice Communication and Data Communication As discussed above, a UE may concurrently maintain two different communication connections, each supported by one of two SIMs. In other words, each communication connection may be supported by a separate SIM. For example, a first connection may be used for data communications, and a second connection may be used for voice communications. The voice communication may be a packet switched communication.

For example, a packet switched data communication supported by the first SIM may be transmitted simultaneously with a packet switched voice communication supported by the second SIM. In the context of a radio with a single transmitter, the term "simultaneously" may refer to the data and voice communications being performed in the same transmit time interval in a time multiplexed fashion, but not actually concurrently, i.e., not actually in a time overlapping manner (since a single transmitter can only transmit one thing at a time). In the context of a radio with two transmitters, the term "simultaneously" may refer to the data and voice communications being performed concurrently, i.e., in a time overlapping manner (since in a radio with two transmitters each transmitter can transmit a respective communication at the same time as the other).

In one example, the packet switched data communication may be according to one or more of UMTS and Evolution Data Optimized (EVDO) protocols and the packet switched voice communication may be according to voice over LTE (VoLTE) protocols. UMTS refers to UMTS-FDD over, for example, a wideband CDMA (WCDMA) air interface and/or UMTS-TDD over, for example, a time division synchronous code division multiplex access (TD-SCDMA) air interface. Embodiments described herein may allow for simultaneous transmission of a VoLTE voice communication and a data communication simultaneously (as defined above), where VoLTE voice communications are inserted into the data communications with reduced or minimal data loss issues.

Note that VoLTE is an interactive data stream between the UE and an LTE network. Uplink (UL) voice frames are transmitted in one UL subframe and downlink (DL) voice frames are received in one DL subframe periodically every 20 or 40 milliseconds (ms). The UE enters a discontinuous reception cycle (DRX) mode in between reception of the DL voice frames. In other words, during the inactive time in the 20/40 ms window, the UE enters the DRX mode. Depending on the quality of the radio signal between the UE and the LTE network (base station), the retransmission rate may be less than 10%, thus, the majority of the window may be spent with the UE in DRX mode. However, if the radio signal is of poor quality, such as at a cell edge, retransmission of the voice frames may utilize the entire 20/40 ms window. Additionally, when transmission time interval (TTI) bundling is used, one UL voice frame may be repeated 4 times and require 4 continuous subframes for each UL transmission in each 20/40 ms window further reducing the time spent by the UE in DRX mode.

For example, a UE may simultaneously transmit a voice communication according to VoLTE and a data communication according to UMTS by time-sharing, or time-multiplexing, at least one radio. For example, a UL voice frame, or LTE subframe, may be given higher priority than UMTS UL channels and may use a portion of the 20/40 ms window. The UMTS UL channels may use the remaining time in the window when the UE would normally enter the DRX mode for UMTS data communications.

Note that UMTS UL physical channels may include both control and data channels such as a dedicated physical control channel (DPCCH), a dedicated physical data channel (UL-DPDCH), an enhanced dedicated physical control channel (UL-E-DPCCH), an enhanced dedicated physical data channel (UL-E-DPDCH), and a high speed dedicated physical control channel (UL-HSDPCCH).

The UL-DPCCH mainly includes uplink pilot signals and layer 1 signaling information while the UL-DPDCH generally carries UL data which may be code spread on multiple 10 ms W-CDMA frames (TTI 10 ms/20 ms/40 ms). Additionally, the UL data size fit into one TTI may be calculated using a transport format combination indicator (TFCI) selection procedure based on the available spread code factor and UL power. The UL-E-DPCCH is a control channel for the enhanced data channel that carries TFCI information for the E-DPDCH channel.

The UL-E-DPDCH carries UL data which are code spread on either 10 ms enhanced data channel frames or 2 ms enhanced data channel frames. Accordingly, the UL data size that fits into one enhanced data channel TTI (2 ms/10 ms) may be calculated using an enhanced TFCI (E TFCI) selection procedure based on the available enhanced data channel spread code factor and enhanced data channel UL power.

The UL-HSDPCCH carries high speed downlink packet access (HSDPA) ACK/NACK and channel quality indicator (CQI) information in 2 ms subframes. Additionally, it may be the feedback channel for HSDPA.

Thus, since the LTE subframe may be given higher priority, the UMTS UL channels may be interrupted for varying amounts of time every 20/40 ms cycle for the LTE subframe transmissions resulting in lost bits. In other words, the UMTS UL channel transmission may contain gaps.

Hence, in some embodiments, for UMTS UL control channels (UL-DPCCH, UL-E-DPCCH, and UL-HSDPCCH), the transmission (TX) power that would have been used for the lost bits may be added on to TX power that may be used for remaining bits in the control channel. Adding the TX power to the remaining bits may allow the network received average power for the particular control channel to remain at the same level and, additionally, allow the particular control channel bit error rate to remain constant.

Figure 6:
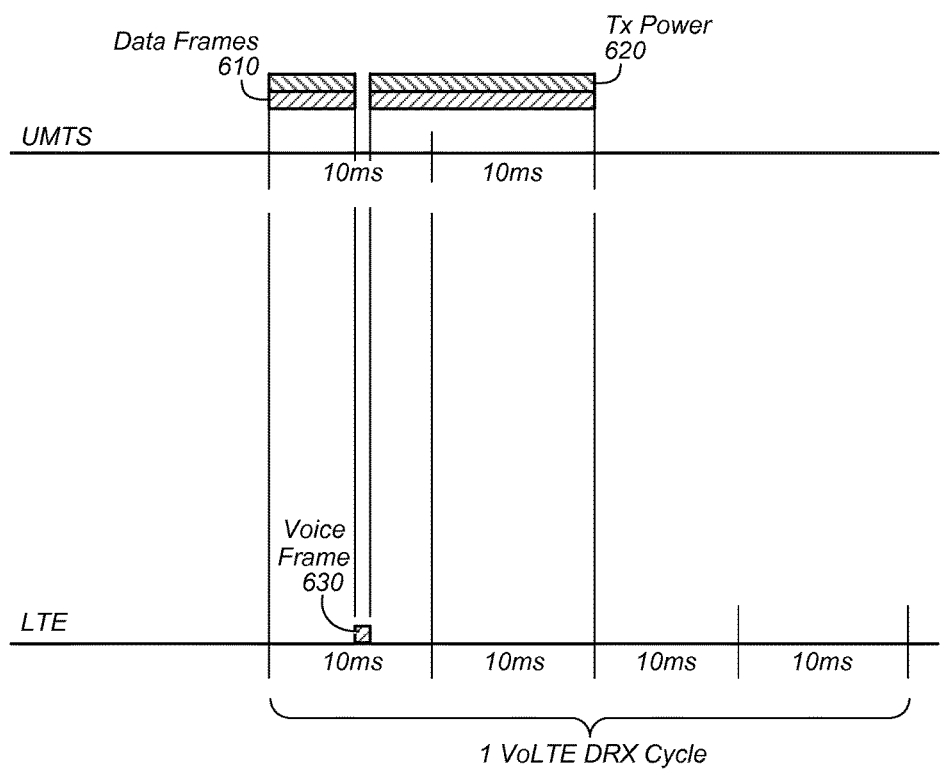
FIG. 6 is an example VoLTE DRX cycle, according to some embodiments.

Furthermore, as shown in FIG. 6, during a VoLTE DRX cycle, as described above, the data frames 610 of a UMTS UL data channel (UL-DPDCH and UL-E-DPDCH) may be interrupted by the voice frame 630, according to some embodiments. The gap created by the interruption in the data frames 610 may result in bit loss as discussed above. To mitigate the bit loss, the TFCI selection and the E-TFCI selection may calculate the data size to be transmitted on the TTI by either reducing the transport block size based on the gaps such that the TX power per bit and bit error rate remains constant or maintain the same transport block size, but increase TX power per bit as if to add the TX power on the lost bits to the remaining bits. Thus, as shown, in either instance, the TX power 620 may remain the same for the UMTS UL data channels with or without the gap for VoLTE.

However, as the quality of the radio signal deteriorates, the voice frames may need to be retransmitted multiple times leading to an increased gap, more lost bits, and less time for UMTS UL transmissions during the VoLTE DRX cycle. In such instances, the UE may monitor the amount of time the UE is tuned to the UMTS UL-DPDCH. In other words, the UE may monitor the tune-away gap percentage of the UMTS UL-DPDCH. If the amount of time the UE is tuned to the UMTS UL-DPDCH decreases below a threshold, or, if the tune-away gap percentage increases above a threshold, the UE may reverse the priority between the voice and data communication. Said another way, if the UE determines that too much time is being dedicated to the voice communication, the UE may elect to drop several LTE subframes in favor of UMTS subframes. In some instances, the UE may further monitor the UL closed loop power control indication from the network in addition to the tune-away gap percentage. In certain instances, the UE may only elect to drop LTE subframes if the LTE transmission has not been discontinued for a specified amount of time.

In certain instances of poor radio conditions, the LTE transmission may continue for the full DRX cycle due to TTI bundling and hybrid automatic repeat request (HARM) retransmissions. In such instances, the UMTS data transmission may be suspended in order to maintain a high quality signal for the voice communication according to VoLTE. In such instances, the UMTS data transmission may be resumed once the UE determines that the radio condition has improved. In one example, the UE may monitor the block error rate of the LTE UL and may determine that the radio condition has improved when the block error rate of the LTE UL has decreased by 10% as compared to when the UMTS data transmission was initially suspended.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
a first subscriber identity module (SIM);
a second SIM; and
a radio coupled to the first SIM and the second SIM, wherein the radio comprises:
a single transmitter shared between the first SIM and the second SIM; and
at least one processor in communication with a memory, wherein the at least one processor is configured to:
determine an uplink data size and an associated first transmit power for an uplink data communication according to a first radio access technology (RAT), wherein the uplink data size is based on a first transmit time interval, and wherein the associated first transmit power corresponds to a network received average power and bit error rate;
determine an uplink voice call communication using a second RAT will interrupt the uplink data communication during the first transmit time interval, wherein the uplink voice call communication has a higher priority than the uplink data communication;
adjust the associated first transmit power to an associated second transmit power based on the interruption of the uplink data communication, wherein the associated second transmit power maintains the network received average power and bit error rate;
perform, via the single transmitter, the uplink data communication using the first RAT in a first portion of the first transmit time interval, the uplink data communication supported by the first SIM, wherein the uplink data communication is performed at the associated second transmit power level;
perform, via the single transmitter, the uplink voice call communication using the second RAT in a second portion of the first transmit time interval, wherein the uplink voice call communication is supported by the second SIM, and wherein the uplink voice call communication is a packet switched communication;
monitor one or more parameters associated with performance of the uplink data communication and the uplink voice call communication; and
in response to at least one of the one or more parameters exceeding a threshold due to radio signal deterioration on the uplink voice call communication, prioritize the uplink data communication over the uplink voice call communication to switch a subframe scheduled for uplink voice call communication to uplink data communication.

2. The UE of claim 1,
wherein the data communication is UMTS; and
wherein the packet-switched voice call communication is Voice over LTE (VoLTE).

3. The UE of claim 1,
wherein the uplink data communication comprises a first portion of transmitted bits and a second portion of un-transmitted bits which are not transmitted during the uplink voice call communication; and
wherein the at least one processor is further configured to apply transmit power that is not used for the second portion of un-transmitted bits to transmission of the first portion of the transmitted bits of the uplink data communication.

4. The UE of claim 1,
wherein the uplink data communication comprises a first portion of transmitted bits and a second portion of un-transmitted bits which are not transmitted during the uplink voice call communication; and
wherein, to adjust the associate first transmit power to the associated second transmit power, the at least one processor is further configured to apply the transmit power that is not used for the first portion of un-transmitted bits during transmission of the first portion of the transmitted bits of the uplink data communication for uplink control channels.

5. The UE of claim 1,
wherein the single transmitter is configured to transmit the uplink data communication with a reduced transport block size, wherein the reduced transport block size results in gaps between transmissions of the uplink data communication; and
wherein the single transmitter is configured to transmit the uplink voice call communication in the gaps between transmissions of the uplink data communication.

6. The UE of claim 1,
wherein the single transmitter is configured to transmit the uplink data communication with a reduced transport block size and to transmit the uplink voice call communication in gaps between transmissions of the uplink data communication for uplink data channels.

7. The UE of claim 1,
wherein the one or more parameters include a data communication uplink channel tune-away gap percentage, wherein the tune-away gap percentage increases as the second portion of the transmit time interval increases, and wherein the tune-away gap decreases as the first portion of the first transmit time interval increases.

8. The UE of claim 1,
wherein the one or more parameters include an uplink closed loop power control indication from the first RAT.

9. A non-transitory computer readable memory medium storing program instructions executable by a processor of a user equipment device (UE) to:
determine an uplink data size and an associated first transmit power for an uplink data communication according to a first radio access technology (RAT), wherein the uplink data size is based on a first transmit time interval, and wherein the associated first transmit power corresponds to a network received average power and bit error rate;
determine an uplink voice call communication using a second RAT will interrupt the uplink data communication during the first transmit time interval, wherein the uplink voice call communication has a higher priority than the uplink data communication;
adjust the associated first transmit power to an associated second transmit power based on the interruption of the uplink data communication, wherein the associated second transmit power maintains the network received average power and bit error rate;
perform, via a transmitter of the UE, the uplink data communication using the first RAT in a first portion of the first transmit time interval, the uplink data communication supported by a first SIM of the UE, wherein the uplink data communication is performed at the associated second transmit power level;
perform, via the transmitter of the UE, the uplink voice call communication using a second RAT in the second portion of the first transmit time interval, wherein the uplink voice call communication is supported by a second SIM of the UE, and wherein the uplink voice call communication is a packet switched communication;
monitor one or more parameters associated with performance of the uplink data communication, wherein the one or more parameters include a tune-away gap percentage, wherein the tune-away gap percentage increases as the second portion of the first transmit time interval increases and the first portion of the first transmit time interval decreases; and
in response to the tune away gap percentage exceeding a threshold, switch a subframe scheduled for uplink voice call communication to uplink data communication, wherein to switch the subframe scheduled for uplink voice call communication, the program instructions are further executable to prioritize the uplink data communication over the uplink voice call communication due to the at least one of the one or more parameters exceeding the threshold.

10. The non-transitory computer readable memory medium of claim 9,
wherein the uplink data communication comprises a first portion of transmitted bits and a second portion of un-transmitted bits which are not transmitted during the uplink voice call communication; and
wherein, to adjust the associate first transmit power to the associated second transmit power, the program instructions are further executable by the processor to apply transmit power that is not used for the second portion of un-transmitted bits to transmissions of the first portion of the transmitted bits of the uplink data communication.

11. The non-transitory computer readable memory medium of claim 10,
wherein the uplink data communication includes uplink data communication for uplink control channels.

12. The non-transitory computer readable memory medium of claim 9,
wherein the program instructions are further executable by the processor to:
transmit the uplink data communication with a reduced transport block size, wherein the reduced transport block size results in gaps between transmissions of the uplink data communication; and
transmit the uplink voice call communication in the gaps between transmissions of the uplink data communication.

13. The non-transitory computer readable memory medium of claim 9,
wherein the one or more parameters further include an uplink closed loop power control indication from the first RAT.

14. An apparatus, comprising:
a memory; and
at least one processor, wherein the at least one processor is in communication with the memory and a transmitter of a wireless device, and wherein the at least one processor is configured to:
  determine an uplink data size and an associated first transmit power for an uplink data communication according to a first radio access technology (RAT), wherein the uplink data size is based on a first transmit time interval, and wherein the associated first transmit power corresponds to a network received average power and bit error rate;
  determine an uplink voice call communication using a second RAT will interrupt the uplink data communication during the first transmit time interval, wherein the uplink voice call communication has a higher priority than the uplink data communication;
  adjust the associated first transmit power to an associated second transmit power based on the interruption of the uplink data communication, wherein the associated second transmit power maintains the network received average power and bit error rate;
  perform, via communication with the transmitter, the uplink data communication using the first RAT in the first portion of the first transmit time interval, the uplink data communication supported by a first subscriber identity module (SIM), wherein the uplink data communication is performed at the associated second transmit power level;
  perform, via communication with the transmitter, the uplink voice call communication using a second RAT in a second portion of the first transmit time interval, wherein the uplink voice call communication is supported by the second SIM, and wherein the uplink voice call communication is a packet switched communication;
  monitor one or more parameters associated with performance of the uplink data communication and the uplink voice call communication, wherein the one or more parameters include durations of the first and second portions of the first transmit time interval; and
  in response to the duration of the second portion of the first transmit time interval exceeding a threshold, prioritize the uplink data communication over the uplink voice call communication to switch a sub-frame scheduled for uplink voice call communication to uplink data communication.

15. The apparatus of claim 14,
wherein the first portion of the transmit time interval and the second portion of the transmit time interval are interleaved.

16. The apparatus of claim 14,
wherein the uplink data communication comprises a first portion of transmitted bits and a second portion of un-transmitted bits which are not transmitted during the uplink voice call communication; and
wherein, to adjust the associate first transmit power to the associated second transmit power, the at least one processor is further configured to apply transmit power that is not used for the second portion of un-transmitted bits to transmission of the first portion of the transmitted bits of the uplink data communication.

17. The non-transitory computer readable memory medium of claim 9,
wherein the second portion of the first transmit time interval increases and the first portion of the first transmit time interval decreases due to radio signal deterioration on the uplink voice call communication.

18. The UE of claim 1,
wherein the one or more parameters include durations of the first and second portions of the first transmit time interval.

19. The UE of claim 1,
wherein the at least one parameter comprises an amount of time dedicated to the voice call communication.

20. The non-transitory computer readable memory medium of claim 9,
wherein the at least one parameter comprises an amount of time that the voice call communication has not been discontinued.

* * * * *